United States Patent
Muraira et al.

(10) Patent No.: US 10,394,628 B1
(45) Date of Patent: Aug. 27, 2019

(54) IN-LINE EVENT HANDLERS ACROSS DOMAINS

(71) Applicant: Microsoft Technology Licensing, LLC, Redmond, WA (US)

(72) Inventors: Juan Pablo Muraira, Redmond, WA (US); Enamul Haque, Bothell, WA (US); Joseph Ryan Warren, Renton, WA (US); Song Yang, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/904,884

(22) Filed: Feb. 26, 2018

(51) Int. Cl.
*G06F 9/44* (2018.01)
*G06F 9/54* (2006.01)

(52) U.S. Cl.
CPC ........ *G06F 9/542* (2013.01); *G06F 2209/543* (2013.01); *G06F 2209/544* (2013.01)

(58) Field of Classification Search
CPC .................................................. G06F 17/5018
USPC ........................................................ 719/318
See application file for complete search history.

(56) References Cited

U.S. PATENT DOCUMENTS

| | | | |
|---|---|---|---|
| 5,925,108 A | 7/1999 | Johnson et al. | |
| 8,239,830 B2 | 8/2012 | Ionfrida et al. | |
| 9,582,314 B2 | 2/2017 | Busch et al. | |
| 9,785,482 B2 * | 10/2017 | Eberhard | G06F 9/54 |
| 10,013,275 B2 * | 7/2018 | Vyas | G06F 9/5055 |
| 2010/0332968 A1 | 12/2010 | Squillace | |
| 2016/0124742 A1 | 5/2016 | Rangasamy et al. | |
| 2017/0006135 A1 | 1/2017 | Siebel | |
| 2017/0187785 A1 | 6/2017 | Johnson et al. | |
| 2018/0041467 A1 | 2/2018 | Vats et al. | |
| 2018/0083826 A1 * | 3/2018 | Wilson | G06F 21/45 |

FOREIGN PATENT DOCUMENTS

| | | |
|---|---|---|
| EP | 1177666 B1 | 12/2009 |
| WO | 2000060455 A2 | 10/2000 |

OTHER PUBLICATIONS

"Microservices—Yesterday, Today, Tomorrow", Retrieved from<<https://garysmicroservices.wordpress.com/tag/events/>>, Jul. 10, 2015, 6 Pages.

Gravelle, Rob, "Working with Inline Event Handlers", Retrieved from<<https://www.htmlgoodies.com/html5/javascript/working-with-inline-event-handlers.html>>, Retrieved on: Nov. 3, 2017, 6 Pages.

(Continued)

*Primary Examiner* — Andy Ho
(74) *Attorney, Agent, or Firm* — Christopher J. Volkmann; Kelly, Holt & Christenson, PLLC

(57) ABSTRACT

Event handler records, for different event handlers in different domains, are stored in an event handler orchestrator service. The event handler records identify event handlers (in various domains) that are to handle events raised in separate domains. When an event is raised, the event handler records are filtered to identify an event handler that has indicated an interest in the raised event, and an end point corresponding to the identified event handler is provided back to the calling process. The calling process then invokes the event handler for which the end point is returned.

20 Claims, 10 Drawing Sheets

(56) References Cited

OTHER PUBLICATIONS

Jones, et al., "Implementing event-based communication between microservices (integration events)", Retrieved from<<https://docs.microsoft.com/en-us/dotnet/standard/microservices-architecture/multi-container-microservice-net-applications/integration-event-based-microservice-communications>>, Dec. 11, 2017, 6 Pages.

Jones, et al., "Subscribing to events", Retrieved from<<https://docs.microsoft.com/en-us/dotnet/standard/microservices-architecture/multi-container-microservice-net-applications/subscribe-events>>, Dec. 11, 2017, 13 Pages.

Robins, Don, "Creating Lightning Components: Events and Messaging", Retrieved from<<https://developer.salesforce.com/blogs/developer-relations/2015/05/creating-lightning-components-events-messaging.html>>, May 19, 2015, 13 Pages.

Torre, Cesar De La, "Using Domain Events within a .NET Core Microservice", Retrieved from<<https://blogs.msdn.microsoft.com/cesardelatorre/2017/03/23/using-domain-events-within-a-net-core-microservice/>>, Mar. 23, 2017, 17 Pages.

Cerrato, et al., "Toward Dynamic Virtualized Network Services in Telecom Operator Networks" Published in Journal of Computer Networks vol. 92, Issue 2, Dec. 9, 2015, pp. 380-395.

Chappell, David, "Introducing the Azure Services Platform an Early Look at Windows Azure, .Net Services, SQL Services, and Live Services", Retrieved From: http://download.microsoft.com/download/e/4/3/e43bb484-3b52-4fa8-a9f9-ec60a32954bc/Azure_Services_Platform.pdf, Oct. 31, 2008, 31 Pages.

Davis, et ai., "A Comparative Study of SOAP and DCOM", Published in Journal of Systems and Software, vol. 76, Issue 2, May, 2005, pp. 157-169.

Kovatsch, et al., "Californium: Scalable Cloud Services for the Internet of Things with CoAP", In Proceedings of International Conference on the Internet of Things, Oct. 6, 2014, pp. 1-6.

McGrath, et al., "Cloud Event Programming Paradigms: Applications and Analysis", In Proceedings of IEEE 9th International Conference on Cloud Computing, Jun. 27, 2016, pp. 400-406.

"International Search Report and Written Opinion Issued in PCT Application No. PCT/US2019/018378", dated Jun. 4, 2019, 14 Pages.

Vijayalakshmi, C., "An Integarted Development Environment to Establish Web Services in Grid Computing Using .NET Framework 4.5 and Visual Basic 2012", In Proceedings of World Congress on Computer and Information Technology, Jun. 22, 2013, 8 Pages.

\* cited by examiner

US 10,394,628 B1

IN-LINE EVENT HANDLERS ACROSS DOMAINS

BACKGROUND

Computing systems are currently in wide use. Some computing systems are used to host a variety of different services.

The services can be hosted in different domains. A domain is defined in a number of different ways. For instance, a domain is defined by a domain name, so that two different services (or bodies of code) that have different domain names, run in different domains. In another definition, a domain is also defined as a microservice. A microservice is a process that communicates with another microservice (or process) over a network (through a network interface) using a technology-agnostic protocol, such as the hypertext protocol (HTTP). A microservice is independently deployable relative to other microservices. A single application may be decomposed into microservices. In such a case, the application is structured as a collection of loosely coupled microservices. Each of these microservices is considered a different domain.

It is common in such computing systems that event handlers are invoked when a process raises an event. In-line event handlers are event handlers that are currently in the same domain that runs the invoking process and that are executed synchronously with the code that raised the event (or the invoking process that was the source of the event).

Running event handler logic in-line with the code that raised the event allows the event handler to inject logic (such as validating data or failing an operation) into the code that was the source of the event. By way of example, before an operation saves data to disc, an event handler can update the computed data, while another event handler can fail the operation because the data is invalid.

However, it may be that an event handler in a separate domain (or microservice) from the domain (or microservice) that raised the event is interested in the event. Currently, event handlers in other domains or microservices (outside the one that raised the event) are called asynchronously. However, this makes it difficult to process the results from that asynchronous event handler prior to completion of the operation that raised the event. Thus, these event handlers are not injecting logic, as an in-line event handler does.

The discussion above is merely provided for general background information and is not intended to be used as an aid in determining the scope of the claimed subject matter.

SUMMARY

Event handler records, for different event handlers in different domains, are stored in an event handler orchestrator service. The event handler records identify event handlers (in various domains) that are to handle events raised in separate domains. When an event is raised, the event handler records are filtered to identify an event handler that has indicated an interest in the raised event, and an end point corresponding to the identified event handler is provided back to the calling process. The calling process then invokes the event handler for which the end point is returned.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
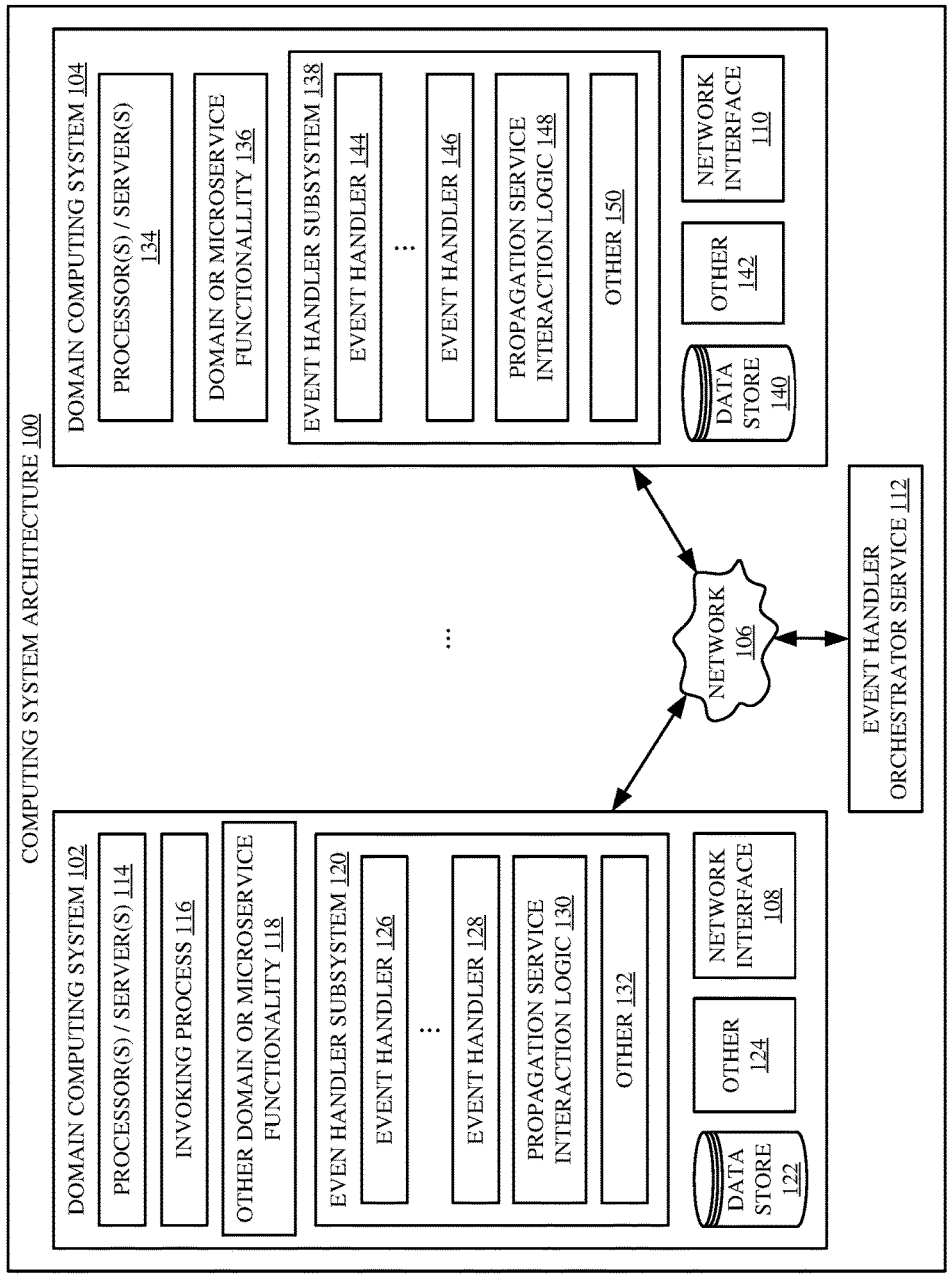
FIG. 1 is a block diagram of one example of a computing system architecture.

FIG. 1 is a block diagram showing one example of a computing system architecture 100. Architecture 100 illustratively includes a plurality of different domain computing systems 102-104 that run separate domains or microservices. The domains or microservices that run on domain computing systems 102-104 are independently deployable modules or services that communicate with one another over network 106. Thus, each of the domains or microservices running on computing systems 102-104 communicate with one another over a network interface 108-110, respectively. The domains or microservices can be identified by unique domain names Domains or microservices running on computing systems 102-104 also communicate with one another over network 106 using a technology-independent protocol, such as hypertext transfer protocol (HTTP). The terms "domain" and "microservice" will be used interchangeably herein.

FIG. 1 also shows that domain computing systems 102-104 are illustratively connected to an event handler orchestrator 112, which can be a service. Event handler orchestrator service 112 illustratively allows events raised in one of the domain computing systems 102-104 to be synchronously acted upon by event handlers in another of the domain computing systems 102-104. Before describing the overall operation of architecture 100 in more detail, a brief description of some of the items in architecture 100 and their operation, will first be provided.

Domain computing system 102 illustratively includes one or more processors or servers 114, domain or microservice functionality that includes invoking process 116, other domain or microservice functionality 118, event handler subsystem 120, data store 122, network interface 108, and it can include a wide variety of other items 124. Event handler subsystem 120 illustratively includes a set of event handlers 126-128, propagation service interaction logic 130, and it can include other items 132. Domain computing system 104 can also include one or more processors or servers 134, a set of domain or microservice functionality 136 (that is a separate domain or microservice from that running on domain computing system 102), event handler subsystem 138, data store 140, network interface 110, and it can include a wide variety of other items 142. Event handler subsystem 138 can include a set of event handlers 144-146, propagation service interaction logic 148, and it can include other items 150.

Invoking process 116 is illustratively a process that raises an event when executing domain functionality for the microservice or domain functionality being run on domain computing system 102, that an event handler is interested in. It thus invokes the interested event handler. The other domain functionality 118 illustratively comprises the rest of the functionality and logic that is run on the domain or microservice running on domain computing system 102.

The event handlers 126-128 in event handler subsystem 120 illustratively process information generated by an event that is raised either inside of domain computing system 102 or on another domain computing system (such as domain computing system 104). In order to process information raised by an event on a different domain computing system 104, the event handlers 126-128 illustratively use propagation service interaction logic 130 in order to communicate with event handler orchestrator service 112. Logic 130 illustratively provides, as is described in more detail below, an identity of the various events that each of the event handlers 126-128 is interested in, and an end point (such as a URL) at which the corresponding event handler can be invoked on by the invoking service. It can also provide a data identifier identifying data that the event handler is interested in receiving when it is invoked.

Similarly, domain functionality 136 is illustratively the logic or functionality performed by the microservice, or domain, running on domain computing system 104. It can, itself, include processes that raise events and thus those processes can become invoking processes as well.

As with event handlers 126-128, the event handlers 144-146 in event handler subsystem 138 use propagation service interaction logic 140 to indicate to event handler orchestrator service 112 which events those event handlers are interested in. They can also provide an end point where they can be called by the invoking service, as well as an indication of which event data they need from the invoking service.

As a brief overview, assume that event handler 144 has indicated to event handler orchestrator service 112 that it is interested in an event that is raised by invoking process 116. In that case, when invoking process 116 raises the event, it calls event handler orchestrator service 112 to find a list of end points that can be called for event handlers that are interested in that event. It then invokes event handler 144, using the corresponding end point, and provides it with event payload data so that event handler 144 can perform its processing on the event. It waits for event handler 144 to return the call before proceeding on with its own processing steps. In this way, event handlers that are even in a separate domain from the invoking process can be invoked synchronously and provide in-line logic to the invoking process, without the need to alter the code in the invoking process or to inject any additional code into the invoking process.

Figure 2:
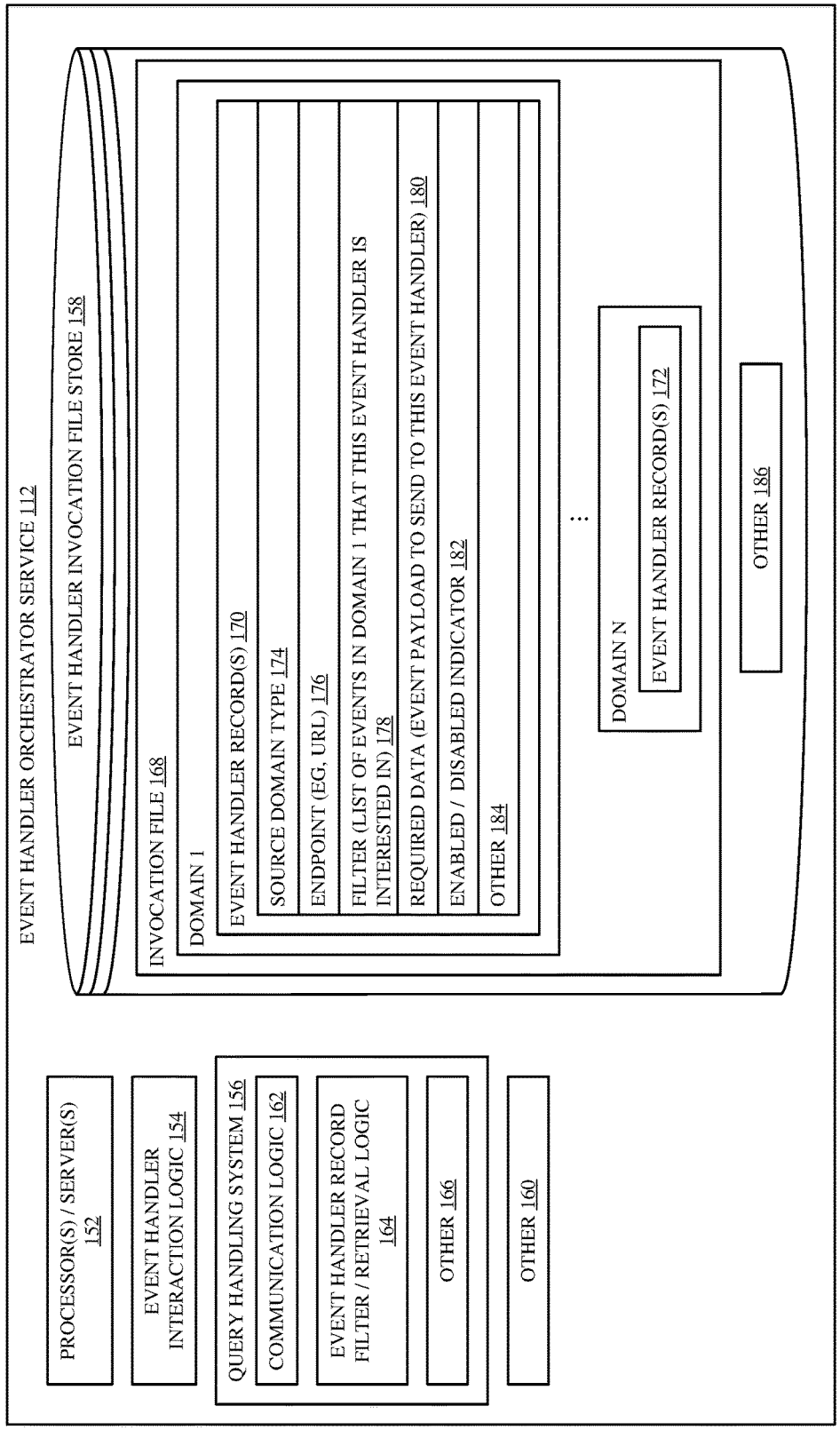
FIG. 2 is a block diagram showing one example of an event handler orchestrator service in more detail.

FIG. 2 is a block diagram showing one example of event handler orchestrator service 112, in more detail. In the example shown in FIG. 2, service 112 illustratively includes one or more processors or servers 152, event handler interaction logic 154, query handling system 156, event handler invocation store 158, and it can include a wide variety of other items 160. Query handing system 156, itself, illustratively includes communication logic 162, event handler record filter/retrieval logic 164, and it can include other items 166. Event handler and invocation store 158 illustratively includes an invocation file 168 that includes one or more event handler records 170-172 for events raised by different domains (e.g., domain 1-domain N). Each event handler record 170-172 illustratively includes a source domain type identifier 174 that identifies the type of the domain that acts as the source of the event (where the invoking process resides). Each of records 170-172 also illustratively include an end point 176 where the event handler corresponding to that event handler record can be called. Records 170-172 also illustratively include filter criteria 178, which illustratively identify a list of events in that particular domain that the event handler corresponding to the record is interested in.

By way of example, assume that event handler record 170 corresponds to event handler 144 in domain computing system 104. Also, assume that event handler 144 is interested in an event raised by invoking process 116 in domain computing system 102. In that case, source domain type 144 will identify the type of the source domain 102 where invoking process 116 is run. End point 176 will identify a URL (or other end point) that can be called to invoke event handler 144. Filter criteria 178 will list the event(s) raised by invoking process 116, that event handler 144 is interested in. Required data identifier 180 illustratively identifies the event payload (or event data) that event handler 144 will use, once it is invoked. An enabled/disabled indicator 182 includes a value that indicates whether the event handler is enabled, or disabled, for the particular list of events identified in filter criteria 178. The event handler records 170-172 can include a wide variety of other items 184 as well. Also, event handler and invocation store 158 can include other items, 186, in addition to the invocation file(s) 168.

Event handler interaction logic 154 illustratively handles communications between propagation service interaction logic 130 and 148 (shown in FIG. 1) and event handler orchestrator service 112. For instance, when an event handler (such as event handler 144) is registering for an event, event handler interaction logic 154 illustratively identifies the various items in event handler records 170-172, corresponding to event handler 144, and the event or events for which it is registering.

Query handling system 156 then handles queries by invoking processes, when they raise an event. For instance, when invoking process 116 raises the event that event handler 144 is interested in, then it communicates through network interface 108 and communication logic 162 with query handling system 156 by providing it an indication of the event that it has raised, and asking for the various event handlers that have registered as being interested in that event. Event handler record filter/retrieval logic 164 then filters the various event handler records 170 for domain 1 (the domain where invoking process 116 resides) to identify those event handlers that have indicated an interest in the event just raised by invoking process 116. It then determines whether those event handlers are enabled (by examining the value of enabled/disabled indicator 182) and for the enabled event handlers, it returns the endpoint 176 and required data 180 to the invoking process 116. The invoking process 116 can then call the event handler on the endpoint, and provide it with the event data that it is to use in performing its event handle processing for this event. Different ways for providing the event data are also discussed below.

In one example, when an event handler (such as event handler 144) is interested in events raised by invoking processes in a plurality of different domain computing systems, then an event handler record 170-172 will be created for that event handler under the different domains (domain 1-domain N) that will be the source of those events. Thus, there may be more than one event handler record for a particular event handler, if it is interested in events raised in different domains. In another example, the event handler records can be arranged differently so that all of the events for all domains are listed in the filter criteria, and the event handler records are not divided out by domain. These and other architectures or arrangements are contemplated herein.

Figure 3:
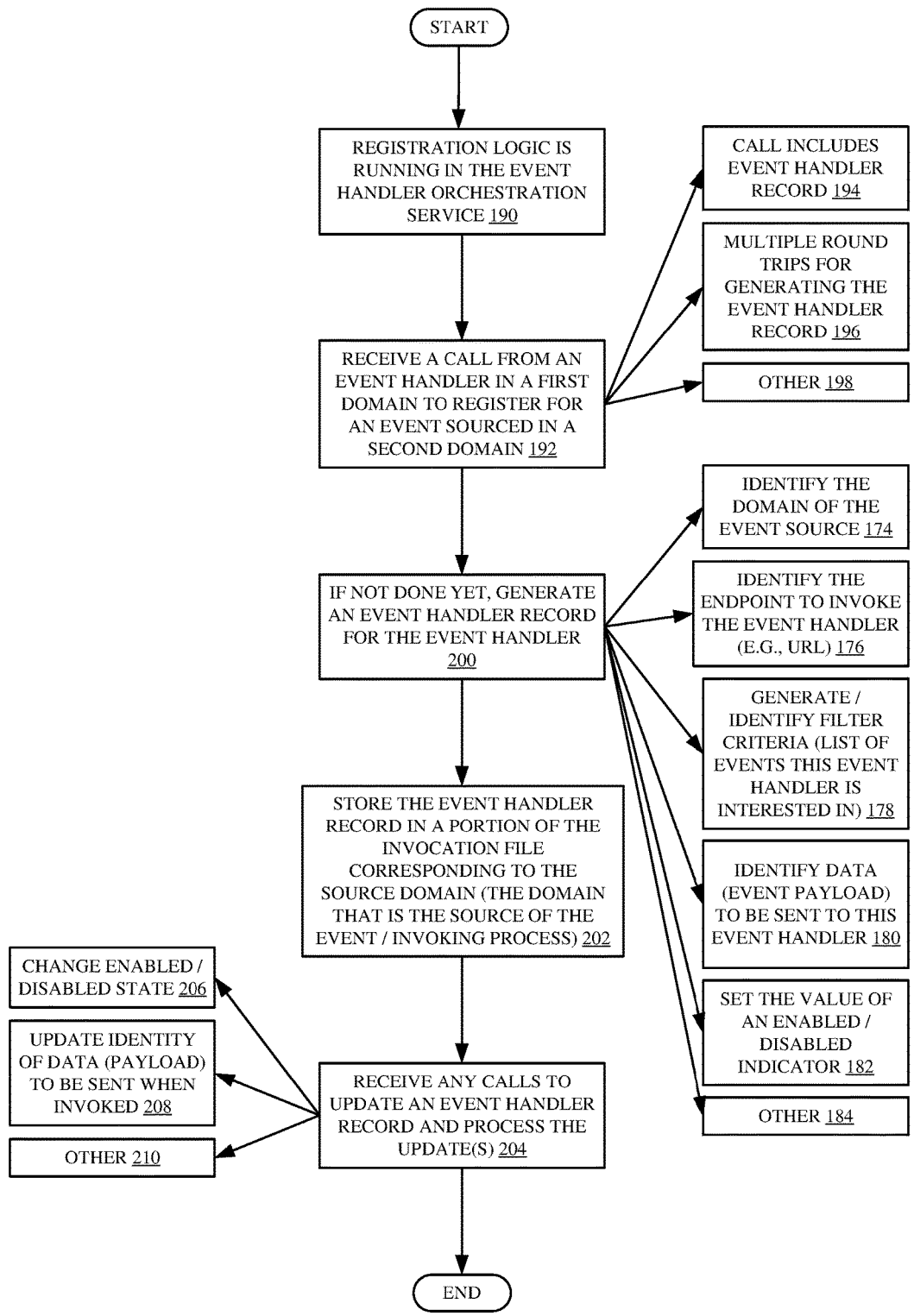
FIG. 3 is a flow diagram illustrating one example of the operation of the event handler orchestrator service in registering event handlers.

FIG. 3 is a flow diagram illustrating one example of the operation of event handler orchestrator service 112 in registering event handlers to be revoked in response to events in different domains. It is first assumed that interaction logic 154 is running on the event handler orchestrator service 112, or that it can be launched. This is indicated by block 190 in the flow diagram of FIG. 3. Event handler interaction logic 154 then receives a call from an event handler (e.g., event handler 144) in a first domain (the domain running on domain computing system 104) to register for an event sourced in a second domain (such as an event sourced or raised by invoking process 116 in the domain running on domain computing system 102). Receiving such a call is indicated by block 192 in the flow diagram of FIG. 3. In one example, propagation service interaction logic 148 can put together the event handler record 170 corresponding to event handler 144 and provide that along with the call. This is indicated by block 194. In another example, event handler interaction logic 154 performs one or more round trips with propagation service interaction logic 148 to obtain the information that is to be included in the event handler record 170 for event handler 144. This is indicated by block 196. The call can be performed in other ways as well, and this is indicated by block 198.

If the event handler record 170 is not yet generated, then event handler interaction logic 154 generates the event handler record for the event handler 144 that is registering for an event. This is indicated by block 200. As discussed above, record 170 identifies the domain of the event source, as indicated by block 174. It identifies the end point for the event handler (e.g., the URL) 176, it identifies the filter criteria (e.g., the list of events that this event handler is interested in) as indicated by block 178, it identifies the data (e.g., event payload) to be sent to this event handler when it is invoked, as indicated by block 180, and it includes a value for the enabled/disabled indicator 182. The event handler record 170 can include other items 184 as well.

Once the event handler record 170 is generated (e.g., by propagation service interaction logic 148 or by event handler interaction logic 154) logic 154 stores the event handler record in a portion of the invocation file 168 corresponding to the domain running on domain computing system 102 (e.g., the domain that is the source of the event/invoking process). This is indicated by block 202 in the flow diagram of FIG. 3.

It should also be noted that, in some examples, the event handlers can call into event handler orchestrator service 112 to update their own event handler records. By way of example, they may change the filter information 178, enable or disable themselves by changing the value of the enabled/disabled indicator 182, or they may change any other items in their event handler records. Similarly, they may provide additional event handler records under other domains, to register for events in those domains. In that case, event handler interaction logic 154 receives those calls to update registration files or other records and processes the updates accordingly. This is indicated by block 204 in the flow diagram of FIG. 3. Changing the enabled/disabled state of an event handler based upon an update call is indicated by block 206. Updating the identity of the data (or payload) information to be sent when the event handler is invoked is indicated by block 208. Updating a wide variety of other items (such as registering for more events, deleting registration of events, etc.) are indicated by block 210.

Figure 4:
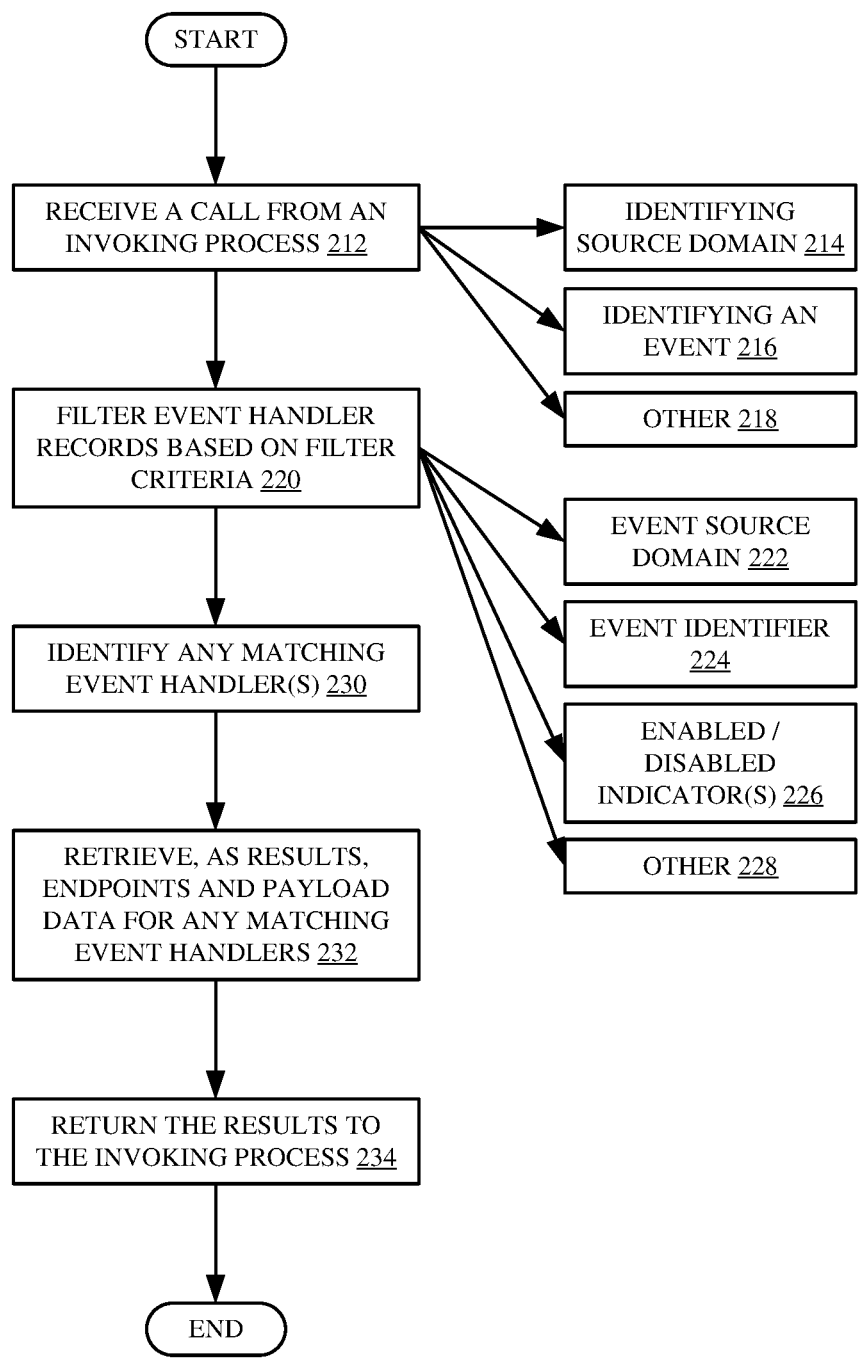
FIG. 4 is a flow diagram illustrating one example of the operation of the event handler orchestrator service in responding to an event raised by an invoking service.

FIG. 4 is a flow diagram illustrating one example of the operation of event handler orchestrator service 112 in receiving a call from an invoking process 116, where an event has occurred, and in responding to that call. It will again be assumed, for the sake of example, that invoking process 116 raises an event for which event handler 144 has registered in event handler orchestrator service 112. When that occurs invoking process 116 generates a call to query handling system 156 in event handler orchestrator service 112. Receiving a call from an invoking process is indicated by block 212 in the flow diagram of FIG. 4. In one example, the call can identify the source domain where the invoking process 116 is running. This is indicated by block 214. The call can identify the particular event that was raised by invoking process 116. This is indicated by block 216. The call can include a wide variety of other items as well, and this is indicated by block 218.

Query handling system 156 illustratively receives the call over suitable communication logic 162. Event handler record filter/retrieval logic 164 then filters the event handler records 170, for the domain where invoking process 116 is running, based upon the various filter criteria. This is indicated by block 220. By way of example, logic 164 can first filter all of the event handler records 170-172 in invocation file 168, based upon the source domain where the event was raised. This is indicated by block 222. In the example discussed, this will mean that logic 164 filters out all event handler records except records 170 corresponding to domain 1 (since this is the domain where invoking process 116 is running)

Logic 164 then filters the event handler records 170 in domain 1, based upon the filter criteria 178 in each of the event handler records. Recall that filter criteria 178 identify the various events in domain 1 that the corresponding event handler is interested in. Therefore, logic 164 filters event handler records 170 to identify those records 170 which contain, in filter criteria 178, an identifier identifying the event that was just raised by invoking process 116, and for which the call was received. Filtering event handler records 170 based on the event identifier is indicated by block 224 in the flow diagram of FIG. 4.

Once the event handler records 170 have been filtered based on the filter criteria 178, they can also be filtered based on the value of the enabled/disabled indicator 182. Thus, only records 170 will be identified which are registered for events in domain 1, which contain an event identifier identifying the particular event that was just raised (in filter criteria 178) and that signify that the corresponding event handler is enabled (as indicated by the enabled/disabled indicator 182). Filtering based one the value of the enabled/disabled indicator is indicated by block 226 in the flow diagram of FIG. 4.

It will be appreciated that logic 164 can filter the various event handler records in a wide variety other ways as well. It can apply the filter criteria (the source domain, the event identifier and the value of the enabled/disabled indicator, etc.) in a different order, it can process all of those filter criteria at the same time, or it can filter the records in other ways. This is indicated by block 228 in the flow diagram of FIG. 4.

Once logic 164 applies all the filter criteria, it identifies any matching event handlers from the event handler records 170 that are identified through the filtering process. Identifying any matching event handlers is indicated by block 230 in the flow diagram of FIG. 4.

Logic 164 then retrieves, from the event handler records corresponding to the matching event handlers, the end point and payload data from endpoint identifier 176 and required data identifier 180 for any matching event handlers. This is indicated by block 232.

Logic 164 then returns, as a result of the received call, a list of the end points 176 that the invoking process 116 is to call to invoke the event handlers, as well as the required data 180 that the invoking process is to provide when it invokes those event handlers. Returning the results to the invoking process 116 is indicated by block 234 in the flow diagram of FIG. 4.

Figure 5A:
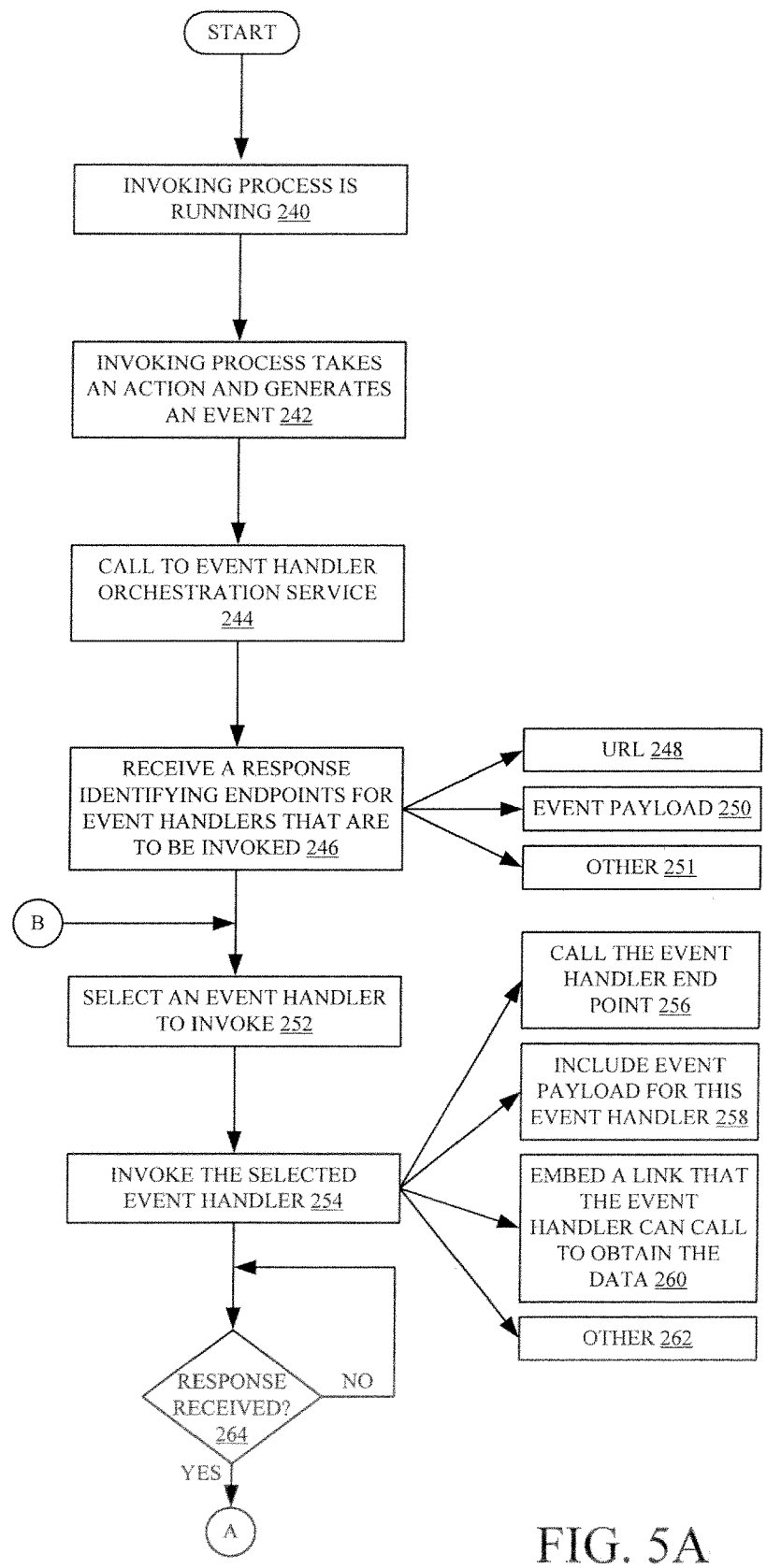
FIGS. 5A and 5B (collectively referred to herein as FIG. 5) show a flow diagram illustrating one example of the operation of an invoking process that raises an event, in invoking an event handler in a different domain.
Figure 5B:
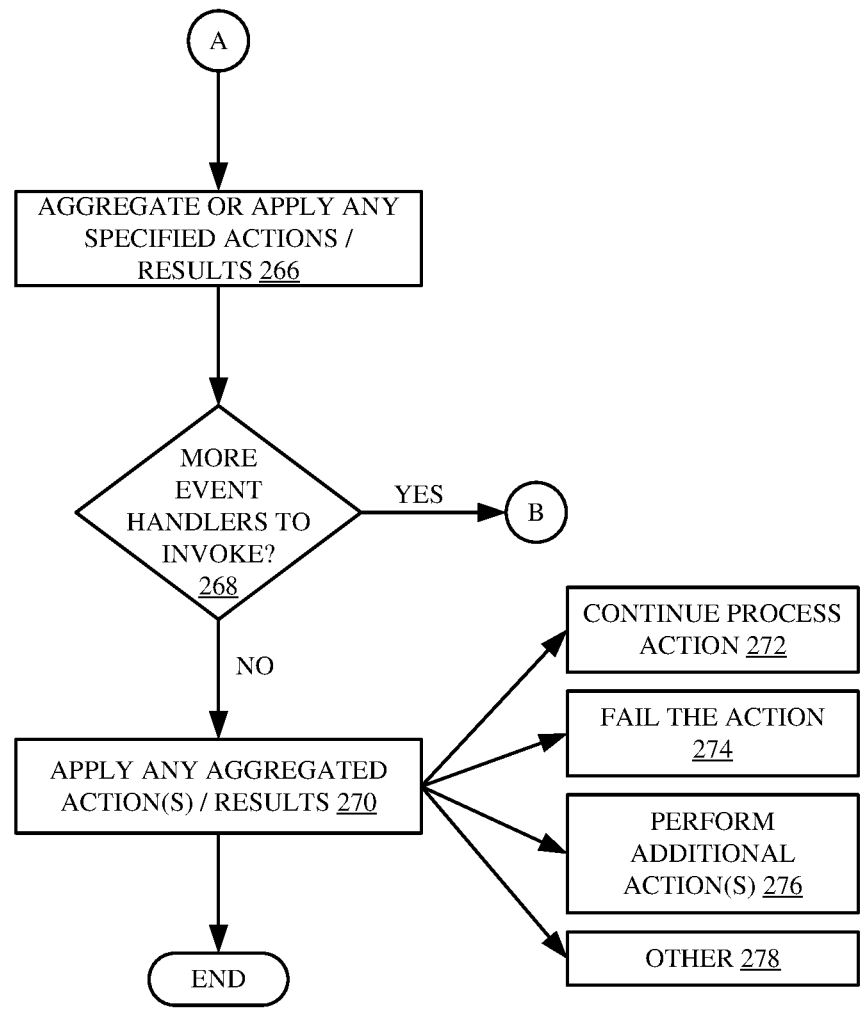

FIGS. 5A and 5B (collectively referred to herein as FIG. 5) show a flow diagram illustrating one example of the operation of invoking process 116 in raising an event, calling to event handler orchestrator service 112, and invoking any event handlers in other domains that are identified by event handler orchestrator service 112. It is first assumed that invoking process 116 is running on domain computing system 102. This is indicated by block 240 in the flow diagram of FIG. 5. At some point, invoking process 116 takes an action and generates an event. This is indicated by block 242. By way of example, it may be that the action is to modify some data, and then to save that modification or change to the data. This is just one example and there are a wide variety of other actions that can raise events as well.

Invoking process 116 can then use propagation service interaction logic 130 to call event handler orchestrator service 112 indicating that it has raised an event. It will be noted that invoking process 116 can directly call inter-domain and event propagation service 112 as well. Calling event handler orchestrator service 112 is indicated by block 244 in the flow diagram of FIG. 5.

As described above, service 112 will identify the various event handlers that are interested in the event that are just raised by invoking process 116 (for the sake of the present example event handler 144), where the event handler is located in a separate domain (e.g., it is part of different domain or microservice functionality running on a different domain computing system 104). It will then return, in response to the call, the endpoint (or URL) where invoking process 116 can invoke the event handler, the event payload information that the event handler wishes to receive, and it can provide other items as well. Receiving a response identifying the endpoints for the event handlers that are to be invoked is indicated by block 246. Receiving the endpoints as a URL is indicated by block 248. Receiving event payload data is indicated by block 250. The response can be provided in a wide variety of other ways as well, and this is indicated by block 252.

It may be that service 112 returns a list of a plurality of different event handlers that are to be invoked by invoking process 116, in a variety of different domains, based on the event that was raised. In that case, invoking process 116 illustratively selects an event handler to invoke. This is indicated by block 252. It then invokes the selected event handler by calling the endpoint identified by service 112, and corresponding to the selected event handler. Invoking the selected event handler is indicated by block 254. Invoking the selected event handler by calling the event handler endpoint is indicated by block 256. It can illustratively include the event payload, for this event handler, (that was identified by service 112). This is indicated by block 258. In another example, where the data may be relatively expensive to provide, invoking process 116 can invoke the selected event handler and embed a link that the event handler can call to obtain the event payload data. This is indicated by block 260. It will be noted that there are also other ways to handle scenarios where the event handler needs the event payload data. For instance, it may be that the event handler only conditionally needs that data, and does not need it every time. It may also be that the data is relatively expensive to obtain, or to provide (in terms of its size, the computing overhead or bandwidth needed to provide it, etc.). There are different was for handling these types of scenarios, and some of them are described below with respect to FIG. 6.

The event handler can be invoked in a wide variety of other ways as well, and this is indicated by block 262.

Before proceeding with additional processing related to the event, invoking process 116 illustratively waits to receive a response from the event handler it has just invoked. This is indicated by block 264 in the flow diagram of FIG. 5. The response from the event handler that it has just invoked may include a set of actions or processing results. For instance, event handler 144 may instruct invoking process 116 to take a set of steps or actions, based upon its processing of the event payload data. It may also indicate other results, such as that its process failed, and therefore the event should fail. In one example, invoking process 116 executes (or applies) the actions or results when they are received. Thus, if an event handler returns a fail as the response, the request can be failed at once. In another example, invoking process 116 aggregates these actions or results with the actions or results that have been received from any other event handlers that have been invoked based upon the present event. Aggregating or applying the actions or results received from the invoked event handlers is indicated by block 266 in the flow diagram of FIG. 5.

Invoking process 116 then determines whether there are any additional event handlers that need to be invoked for this process. If so, processing reverts to block 252 where the next event handler in the list of event handlers received from service 112, is selected and invoked. Determining whether additional event handlers are to be invoked is indicated by block 268.

Once invoking process 116 has invoked all of the event handlers that were identified by event handler orchestrator service 112, then it proceeds to apply any aggregated actions or results received from those event handlers, if they have not already been applied. This is indicated by block 270. By way of example, it can continue taking steps or actions with the process, based on the event. This is indicated by block 272. In another example, where one of the event handlers has failed the event, it can fail the action that it was about to take. For instance, where the event is that data has been modified and the modification is to be saved, invoking process 116 can fail that modification action and refrain from saving the modification to the data, if one of the event handlers returns failed. Failing the action is indicated by block 274 in the flow diagram of FIG. 5. Invoking process 116 may perform additional actions that are specified by one or more event handlers that have been invoked. Performing the additional actions is indicated by block 276. Applying the aggregated actions and results can be done in a wide variety of other way as well, and this is indicated by block 278.

Figure 6:
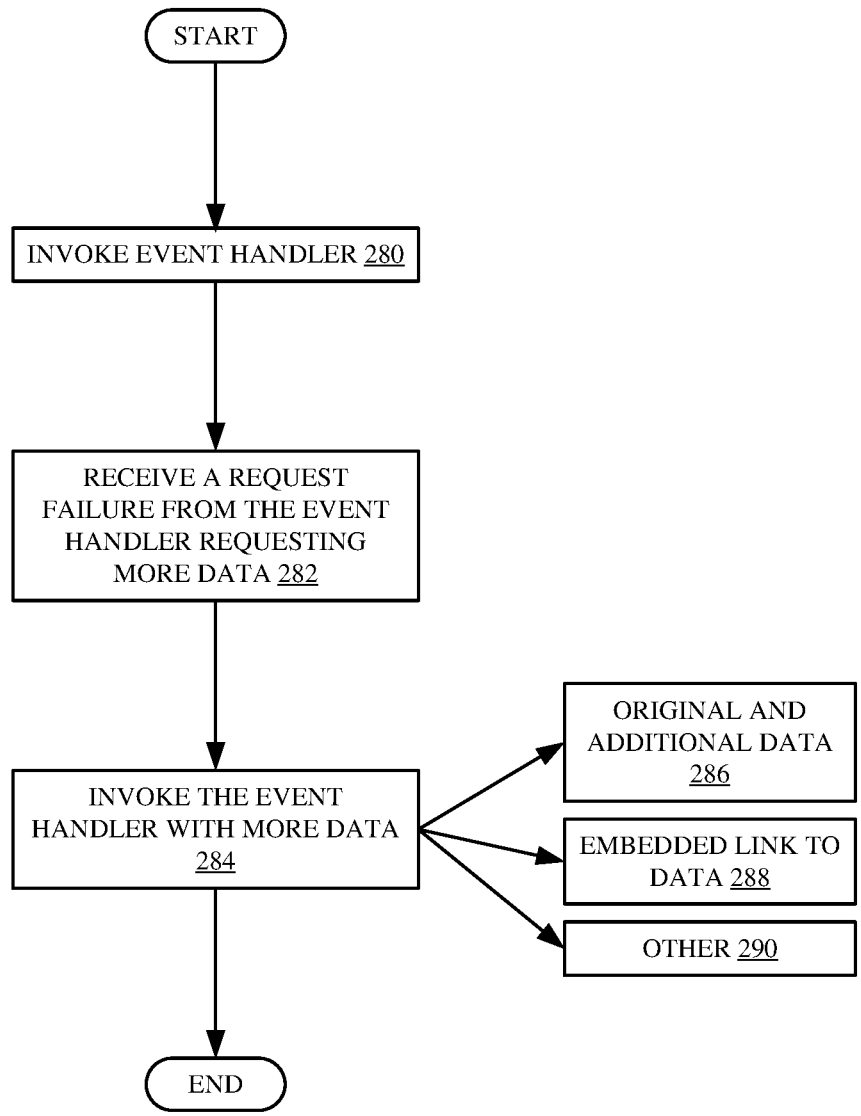
FIG. 6 is a flow diagram showing one example of the operation of an invoking process in providing data to an event handler.

FIG. 6 is a flow diagram illustrating one example of the operation of invoking process 116 invoking an event handler, where the event handler requires event payload data that is relatively expensive to provide. As discussed above with respect to block 260 in FIG. 5, the invoking process (when it invokes the event handler) can handle this in a variety of different ways. In the example discussed above, the invoking process can embed a link to the event payload data (or other data) that the event handler needs to perform its operations. The event handler can then, itself, access the data through that link. In the example described with respect to FIG. 6, invoking process 116 first invokes the event handler using the URL provided by event handler orchestrator service 112. This is indicated by block 280 in the flow diagram of FIG. 6. Assume, for the sake of example, that invoking process 116 invokes event handler 144. In the example discussed with respect to FIG. 6, event handler 144 illustratively fails the request from invoking process 116 and, also requests more data from invoking process 116. This is indicated by block 282.

Invoking process 116, in response to the fail and request for more data, invokes event handler 142 with more data. This is indicated by block 284 in the flow diagram of FIG. 6. This can be done in a number of different ways. For instance, it may be that invoking process 116 knows that the event handler 144 only conditionally needs the full extent of the event payload data. Therefore, when invoking process 116 first invokes event handler 144, it only provides a subset of the data, or it provides none of the data at all. This is because, it may be that event handler 144 can often perform its processing without any of the event payload data, or with the relatively small subset of payload data.

When event handler 144 does need the additional data, then if fails the request and requests the additional data from invoking process 116 as indicated by block 282. Invoking process 116 can then invoke event handler 144 again, with the original data that it provided, along with additional data. This is indicated by block 286. When invoking process 116 invokes event handler 144 with the original data it provided, and with additional data, this means that event handler 144 need not cache the original data that it received when invoked by invoking process 116. Instead, invoking process 116 provides that data again, when it re-invokes event handler 144 with the additional data.

In another example, invoking process 116 can again embed a link to the additional data and provide that to event handler 144 when it re-invokes event handler 144. Embedding a link to the data is indicated by block 288. Invoking process 116 can invoke event handler 144 to provide it with the additional data in other ways as well. This is indicated by block 290.

Figure 7:
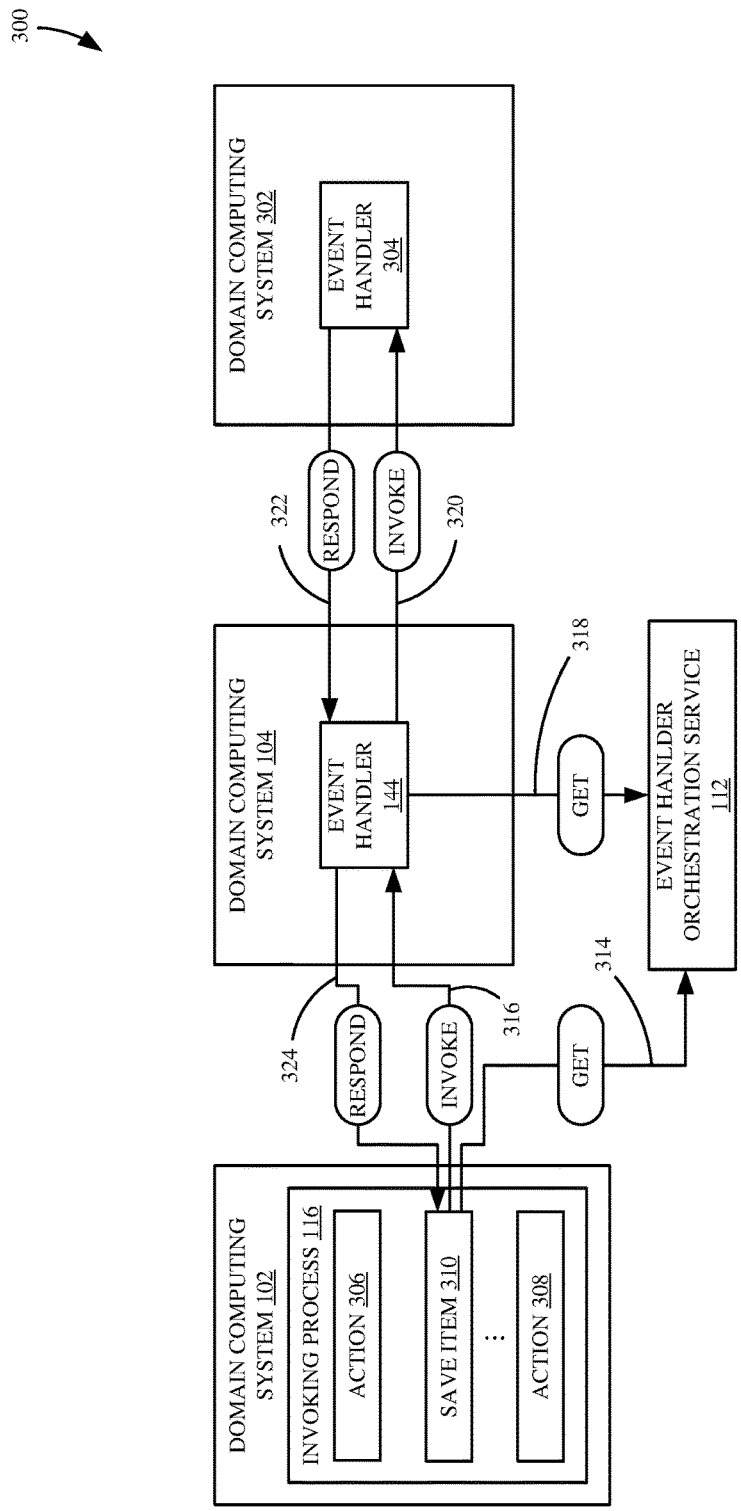
FIG. 7 is a partial block diagram, partial sequence diagram, showing one example of the operation of the architecture illustrated in FIG. 1 in conducting event handler chaining.

FIG. 7 is a partial block diagram, partial sequence diagram illustrating yet another example of the operation of architecture 100 in handling events with event handlers across a plurality of different domains. Some of the items shown in FIG. 7 are similar to those shown in previous Figures, and they are similarly numbered. FIG. 7 shows an architecture 300, in which domain computing systems 102 and 104 operate, along with domain computing system 302. Domain computing systems 104 and 302 illustratively have event handlers 144 and 304. FIG. 7 shows that invoking process 116 illustratively performs a set of actions 306-308 and, in the process, raises an event 310 entitled "SaveItem". Event handler 144 has illustratively registered with event handler orchestrator service 112 to be invoked by invoking process 116 when process 116 raises the SaveItem event 310. Also, event handler 304 in domain computing system 302 has registered with event handler orchestrator service 112 to be invoked by event handler 144, when event hander 144 raises an event indicating that it has, itself, been invoked. This type of processing can be referred to as "chaining".

More specifically, in one example, when invoking process 116 raises the SaveItem event 310, it calls to event handler orchestrator service 112 (as indicated by arrow 314) to obtain a list of the various event handlers (including event handler 144) that are to be invoked based on raising the SaveItem event 310. It then selects event handler 144 and invokes it, as indicated by arrow 316. In response, event handler 144 raises an event indicating that it has been invoked and thus calls to event handler orchestrator service 112 to identify other event handlers that are to be invoked based upon that event. This is indicated by arrow 318. Service 112 illustratively responds to that call identifying event handler 304 which has registered to be invoked upon event handler 144 being invoked. Thus, event handler 144 invokes event handler 304, and this is indicated by block 320.

Event handler 304 then performs its actions and responds to event handler 144, as indicated by block 322. The response 322 can include actions or results from event handler 304. Event handler 144 then performs its actions, and aggregates its own results or actions with the results or actions in the response 322 of event handler 304 and provides those items, as a response 324, to invoking process 116 (and specifically to the SaveItem event 310). In this way, multiple nested event handlers can be called when invoking process 116 raises a single event. The multiple, nested event handers can be in a variety of different domains, and results of their processing can be aggregated and provided back to invoking process 116. Thus, all of the event handlers in the chain can effectively insert logic into the invoking process, without actually changing the logic in the invoking process, itself. Instead, by using the event handler orchestrator service 112, the event handlers in different domains can be invoked in a cross-domain way, in a nested way, or in combinations of those different ways.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
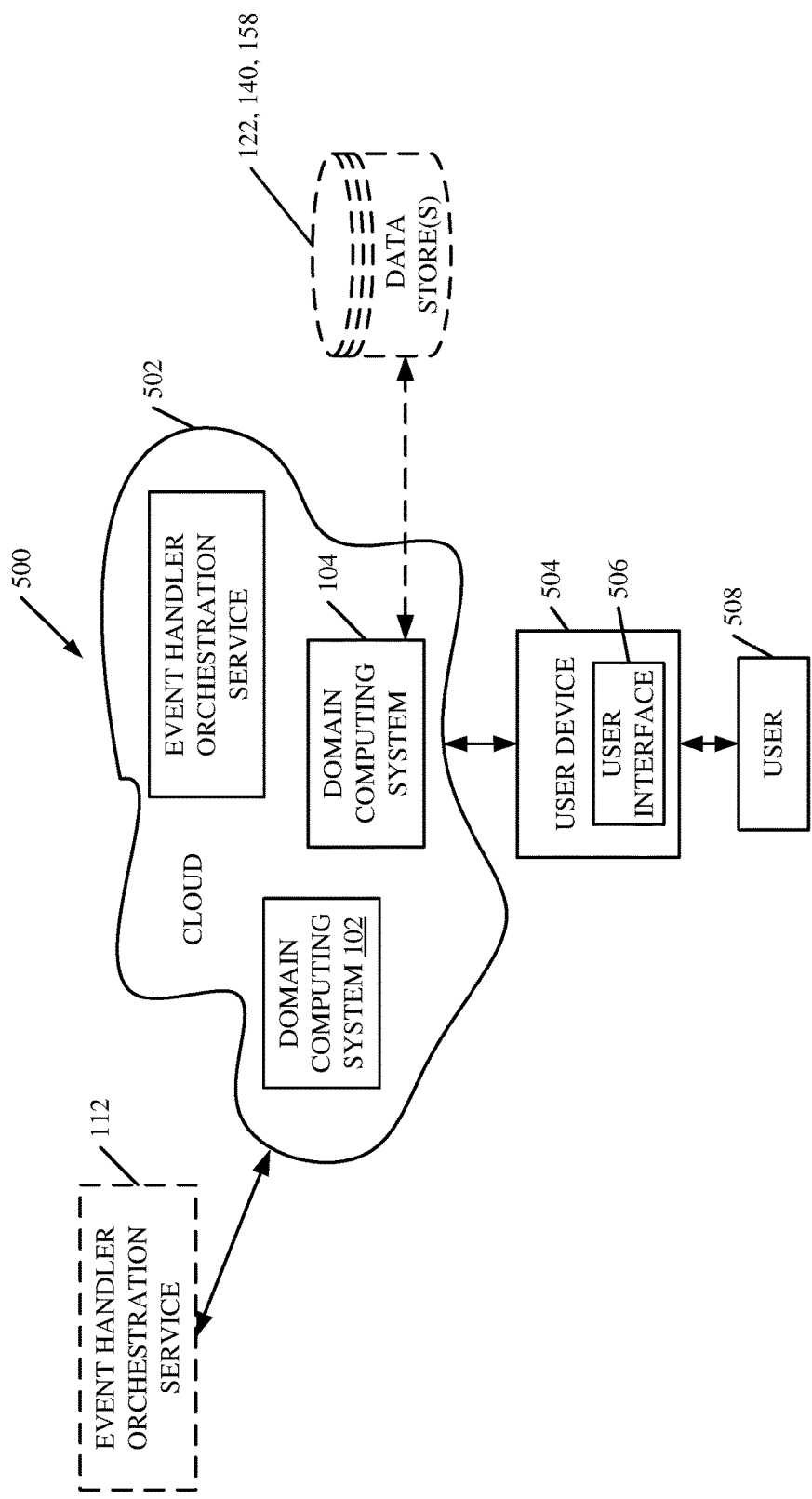
FIG. 8 is a block diagram showing one example of the architecture illustrated in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that computing systems 102 and 104 and service 112 can be located in cloud 502 (which can be public, private, or a combination where portions are public while others are private). Therefore, user 508 uses a user device 504, with user interface 506, to access those systems through cloud 502.

FIG. 8 also depicts another example of a cloud architecture. FIG. 8 shows that it is also contemplated that some elements of architecture 100 can be disposed in cloud 502 while others are not. By way of example, data stores 122, 140, 158 can be disposed outside of cloud 502, and accessed through cloud 502. In another example, service 112 (or other items) can be outside of cloud 502. Regardless of where they are located, they can be accessed directly by the other systems or servers over a network, by device 504, through a network they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
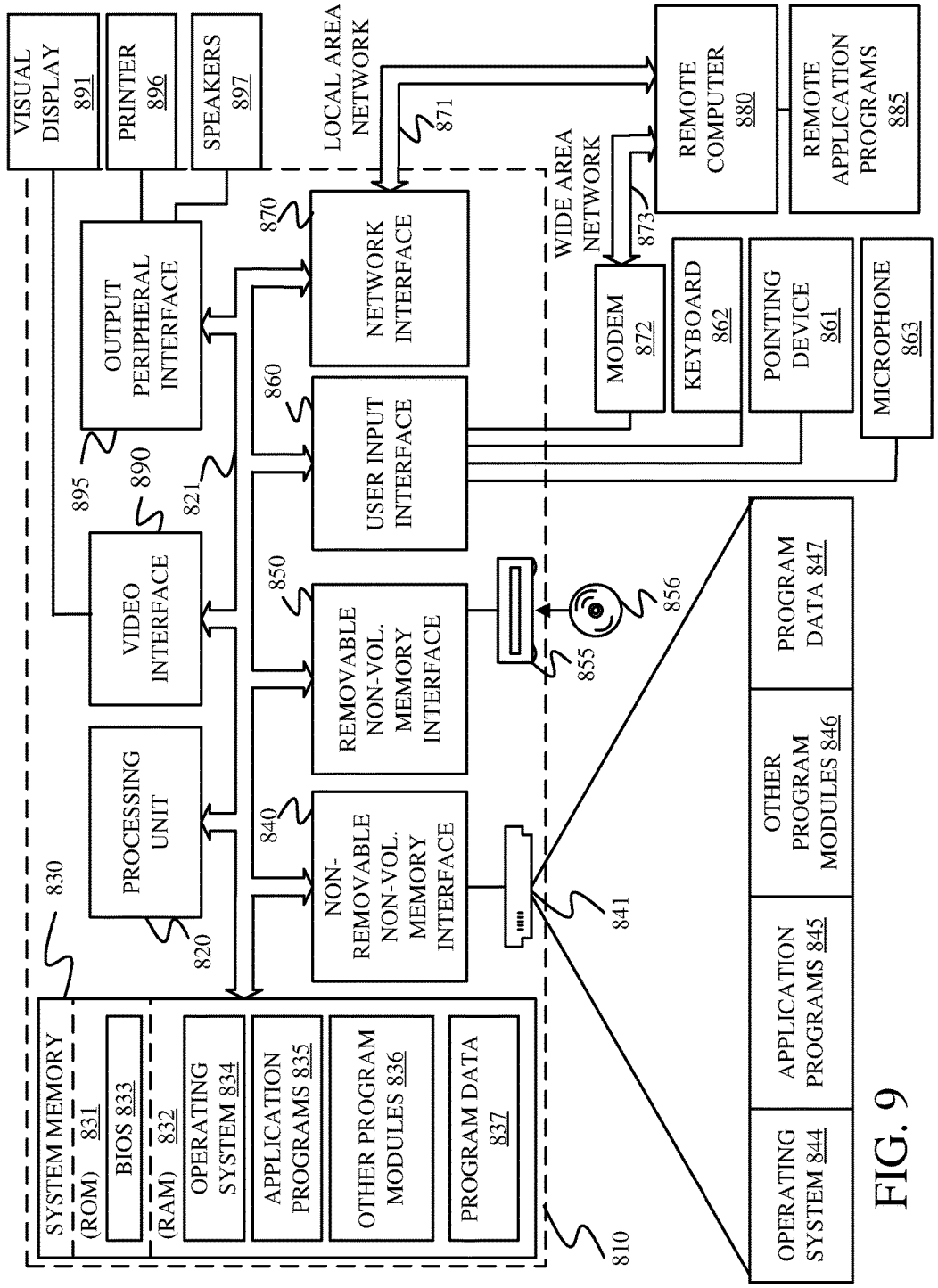
FIG. 9 is a block diagram showing one example of a computing environment that can be used in the architectures shown in the previous Figures.

FIG. 9 is one example of a computing environment in which parts of architecture 100, can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a computer processor;
a communication system that communicates, through a network interface, with a first domain computing system and a second domain computing system that is different from the first domain computing system, the first and second domain computing systems communicating with one another through corresponding network interfaces; and
an event handler orchestrator service that stores a first event handler record corresponding to a first event handler in the first domain computing system, the first event handler record including filter criteria identifying an event of interest raised by an invoking process running the second domain computing system, the event handler orchestrator service receiving a call from the invoking process when the event of interest is raised by the invoking process in the second domain computing system and returning, to the invoking process, an endpoint in the first domain computing system, corresponding to the first event handler, for invoking the first event handler.

Example 2 is the computing system of any or all previous examples wherein the event handler orchestrator service comprises:

event handler interaction logic configured to receive a call from the first event handler in the first domain computing system and, based on the call, store, in the first event handler record, the endpoint corresponding to the first event handler and filter criteria corresponding to the first event handler, the filter criteria being indicative of the event of interest to the first event handler raised by the invoking process running in the second domain computing system.

Example 3 is the computing system of any or all previous examples wherein the event handler orchestrator service stores a plurality of different event handler records corresponding to different event handlers in different domain computing systems, each event handler record having filter criteria indicating events of interest to the corresponding event handler.

Example 4 is the computing system of any or all previous examples wherein the event handler orchestrator service comprises:

event handler record filtering logic configured to receive the call from the invoking process when the event of interest to the first event handler is raised, the call from the invoking process including an event identifier identifying the raised event, and the event handler record filtering logic being configured to filter the event handler records based on the filter criteria and the event identifier to identify the first event handler record.

Example 5 is the computing system of any or all previous examples wherein the event handler orchestrator service comprises:

event handler record retrieval logic configured to obtain, from the first event handler record, the endpoint for invoking the first event handler and to return the endpoint to the invoking process in response to the call from the invoking process.

Example 6 is the computing system of any or all previous examples wherein the event handler interaction logic is configured to receive the call from the first event handler in the first domain computing system and, based on the call, store, in the first event handler record, an event payload indicator indicative of data to be used by the first event handler when invoked by the invoking process based on the event of interest to the first event handler being raised by the invoking process Example 7 is the computing system of any or all previous examples wherein the event handler record retrieval logic is configured to obtain, from the first event handler record, the event payload indicator and to return the event payload indicator to the invoking process in response to the call from the invoking process.

Example 8 is the computing system of any or all previous examples wherein the event handler interaction logic is configured to receive an update call from the first event handler and to change the first event handler record based on the update call.

Example 9 is a computer implemented method of invoking an event handler based on a raised event, the method comprising:

raising an event in a process running on a first domain computing system;

generating a call, through a network interface, to an event handler orchestrator service, the call including an indication of the raised event;

receiving, from the event handler orchestrator service and in response to the call, an endpoint corresponding to an event handler in a second domain computing system;

invoking the event handler, through the network interface, using the endpoint;

waiting to perform additional operations corresponding to the raised event until a response is received in response to invoking the event handler in the second domain computing system;

receiving the response from the event handler in the second domain computing system; and performing additional operations corresponding to the event based on the response from the event handler in the second domain computing system.

Example 10 is the computer implemented method of any or all previous examples and further comprising:

receiving, from the event handler orchestrator service, a data indicator indicative of data to be used by the event handler.

Example 11 is the computer implemented method of any or all previous examples wherein invoking the event handler comprises:

providing the event handler with the data identified by the data indicator through the network interface.

Example 12 is the computer implemented method of any or all previous examples wherein invoking the event handler comprises:

providing the event handler with a link to the data identified by the data indicator.

Example 13 is the computer implemented method of any or all previous examples wherein invoking the event handler comprises providing the event handler with at least a portion of the data identified by the data indicator and wherein receiving the response from the event handler comprises receiving a request for additional data.

Example 14 is the computer implemented method of any or all previous examples and further comprising:

responding to the request for additional data with the portion of data and the additional data.

Example 15 is a computer implemented method, comprising:

receiving, from an invoking process running in a first domain computing system, a call at an event handler orchestrator service, through a network interface, when an event is raised by the invoking process in the first domain computing system, the call including an event identifier identifying the event raised by the invoking process;

accessing a set of event handler records corresponding to a set of event handlers, at least a first of the event handlers being in a second domain computing system, each of the event handler records including filter criteria identifying events of interest to the corresponding event handler;

filtering the set of event handler records based on the event identifier and the filter criteria to identify a first event handler record that includes filter criteria corresponding to the event identifier, the first event handler record corresponding to the first event handler; and returning, to the invoking process, an endpoint in the second domain computing system, corresponding to the first event handler, identified in the first event handler record, for invoking the first event handler.

Example 16 is the computer implemented method of any or all previous examples and further comprising:

receiving a call at the event handler orchestrator service from the first event handler in the second domain computing system; and based on the call, storing, in the first event handler record, the endpoint corresponding to the first event handler and filter criteria corresponding to the first event handler, the filter criteria being indicative of the event raised by the invoking process running in the first domain computing system.

Example 17 is the computer implemented method of any or all previous examples wherein receiving a call at the event handler orchestrator service from the first event handler comprises receiving the call from the first event handler in the second domain computing system and, based on the call, storing, in the first event handler record, an event payload indicator indicative of data to be used by the first event handler when invoked by the invoking process based on the event raised by the invoking process Example 18 is the computer implemented method of any or all previous examples and further comprising:
obtaining, from the first event handler record, the event payload indicator; and
returning the event payload indicator to the invoking process in response to the call from the invoking process.

Example 19 is the computer implemented method of any or all previous examples and further comprising:
receiving an update call at the event handler orchestrator service from the first event handler indicating a change to the first event handler record; and
changing the first event handler record based on the update call.

Example 20 is the computer implemented method of any or all previous examples wherein each of the event handler records includes a corresponding enable/disable indicator indicating an enablement state of the corresponding event handler record and a domain indicator indicating a domain of an invoking process that raises the event of interest identified by the filter criteria and wherein filtering comprises:
filtering the event handler records based on the enable/disable indicator and the domain indicator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a computer processor;
a communication system that communicates, through a network interface, with a first domain computing system and a second domain computing system that is different from the first domain computing system, the first and second domain computing systems communicating with one another through corresponding network interfaces; and
an event handler orchestrator service that stores a first event handler record corresponding to a first event handler in the first domain computing system, the first event handler record including filter criteria identifying an event of interest raised by an invoking process running the second domain computing system, the event handler orchestrator service receiving a call from the invoking process when the event of interest is raised by the invoking process in the second domain computing system and returning, to the invoking process, an endpoint in the first domain computing system, corresponding to the first event handler, for invoking the first event handler.

2. The computing system of claim 1 wherein the event handler orchestrator service comprises:
event handler interaction logic configured to receive a call from the first event handler in the first domain computing system and, based on the call, store, in the first event handler record, the endpoint corresponding to the first event handler and filter criteria corresponding to the first event handler, the filter criteria being indicative of the event of interest to the first event handler raised by the invoking process running in the second domain computing system.

3. The computing system of claim 2 wherein the event handler orchestrator service stores a plurality of different event handler records corresponding to different event handlers in different domain computing systems, each event handler record having filter criteria indicating events of interest to the corresponding event handler.

4. The computing system of claim 3 wherein the event handler orchestrator service comprises:
event handler record filtering logic configured to receive the call from the invoking process when the event of interest to the first event handler is raised, the call from the invoking process including an event identifier identifying the raised event, and the event handler record filtering logic being configured to filter the event handler records based on the filter criteria and the event identifier to identify the first event handler record.

5. The computing system of claim 4 wherein the event handler orchestrator service comprises:
event handler record retrieval logic configured to obtain, from the first event handler record, the endpoint for invoking the first event handler and to return the endpoint to the invoking process in response to the call from the invoking process.

6. The computing system of claim 5 wherein the event handler interaction logic is configured to receive the call from the first event handler in the first domain computing system and, based on the call, store, in the first event handler record, an event payload indicator indicative of data to be used by the first event handler when invoked by the invoking process based on the event of interest to the first event handler being raised by the invoking process.

7. The computing system of claim 6 wherein the event handler record retrieval logic is configured to obtain, from the first event handler record, the event payload indicator and to return the event payload indicator to the invoking process in response to the call from the invoking process.

8. The computing system of claim 2 wherein the event handler interaction logic is configured to receive an update call from the first event handler and to change the first event handler record based on the update call.

9. A computer implemented method of invoking an event handler based on a raised event, the method comprising:
raising an event in a process running on a first domain computing system;
generating a call, through a network interface, to an event handler orchestrator service, the call including an indication of the raised event;
receiving, from the event handler orchestrator service and in response to the call, an endpoint corresponding to an event handler in a second domain computing system;
invoking the event handler, through the network interface, using the endpoint;

waiting to perform additional operations corresponding to the raised event until a response is received in response to invoking the event handler in the second domain computing system;

receiving the response from the event handler in the second domain computing system; and performing additional operations corresponding to the event based on the response from the event handler in the second domain computing system.

10. The computer implemented method of claim 9 and further comprising:

receiving, from the event handler orchestrator service, a data indicator indicative of data to be used by the event handler.

11. The computer implemented method of claim 10 wherein invoking the event handler comprises:

providing the event handler with the data identified by the data indicator through the network interface.

12. The computer implemented method of claim 10 wherein invoking the event handler comprises:

providing the event handler with a link to the data identified by the data indicator.

13. The computer implemented method of claim 10 wherein invoking the event handler comprises providing the event handler with at least a portion of the data identified by the data indicator and wherein receiving the response from the event handler comprises receiving a request for additional data.

14. The computer implemented method of claim 13 and further comprising:

responding to the request for additional data with the portion of data and the additional data.

15. A computer implemented method, comprising:

receiving, from an invoking process running in a first domain computing system, a call at an event handler orchestrator service, through a network interface, when an event is raised by the invoking process in the first domain computing system, the call including an event identifier identifying the event raised by the invoking process;

accessing a set of event handler records corresponding to a set of event handlers, at least a first of the event handlers being in a second domain computing system, each of the event handler records including filter criteria identifying events of interest to the corresponding event handler;

filtering the set of event handler records based on the event identifier and the filter criteria to identify a first event handler record that includes filter criteria corresponding to the event identifier, the first event handler record corresponding to the first event handler; and returning, to the invoking process, an endpoint in the second domain computing system, corresponding to the first event handler, identified in the first event handler record, for invoking the first event handler.

16. The computer implemented method of claim 15 and further comprising:

receiving a call at the event handler orchestrator service from the first event handler in the second domain computing system; and based on the call, storing, in the first event handler record, the endpoint corresponding to the first event handler and filter criteria corresponding to the first event handler, the filter criteria being indicative of the event raised by the invoking process running in the first domain computing system.

17. The computer implemented method of claim 16 wherein receiving a call at the event handler orchestrator service from the first event handler comprises receiving the call from the first event handler in the second domain computing system and, based on the call, storing, in the first event handler record, an event payload indicator indicative of data to be used by the first event handler when invoked by the invoking process based on the event raised by the invoking process.

18. The computer implemented method of claim 17 and further comprising:

obtaining, from the first event handler record, the event payload indicator; and returning the event payload indicator to the invoking process in response to the call from the invoking process.

19. The computer implemented method of claim 16 and further comprising:

receiving an update call at the event handler orchestrator service from the first event handler indicating a change to the first event handler record; and changing the first event handler record based on the update call.

20. The computer implemented method of claim 15 wherein each of the event handler records includes a corresponding enable/disable indicator indicating an enablement state of the corresponding event handler record and a domain indicator indicating a domain of an invoking process that raises the event of interest identified by the filter criteria and wherein filtering comprises:

filtering the event handler records based on the enable/disable indicator and the domain indicator.

* * * * *